United States Patent
Reese, Jr. et al.

(10) Patent No.: US 9,403,350 B2
(45) Date of Patent: Aug. 2, 2016

(54) FLASH CONTROL METAL BONDING

(71) Applicants: Roy Jefferson Reese, Jr., Owasso, OK (US); William Christopher Butler, Broken Arrow, OK (US)

(72) Inventors: Roy Jefferson Reese, Jr., Owasso, OK (US); William Christopher Butler, Broken Arrow, OK (US)

(73) Assignee: The NORDAM Group, INC., Tulsa, OK (US)

(*) Notice: Subject to any disclaimer, the term of this patent is extended or adjusted under 35 U.S.C. 154(b) by 225 days.

(21) Appl. No.: 14/106,941

(22) Filed: Dec. 16, 2013

(65) Prior Publication Data

US 2015/0165742 A1   Jun. 18, 2015

(51) Int. Cl.
*B32B 37/10* (2006.01)
*B32B 15/00* (2006.01)
*B32B 37/18* (2006.01)
*B32B 37/12* (2006.01)

(52) U.S. Cl.
CPC ............. *B32B 37/1018* (2013.01); *B32B 15/00* (2013.01); *B32B 37/18* (2013.01); *B32B 2037/1253* (2013.01); *B32B 2309/10* (2013.01); *B32B 2311/24* (2013.01); *B32B 2363/00* (2013.01); *B32B 2605/18* (2013.01)

(58) Field of Classification Search
CPC .................. B32B 15/00; B32B 15/016; B32B 2037/1253; B32B 2309/10; B32B 2309/68; B32B 2311/24; B32B 2363/00; B32B 2605/18; B32B 37/1018; B32B 37/18; B29C 66/81
USPC ............................................ 156/64, 247, 330
See application file for complete search history.

(56) References Cited

U.S. PATENT DOCUMENTS

| | | | |
|---|---|---|---|
| 3,146,148 A | 8/1964 | Mitchella et al. | |
| 4,783,228 A | 11/1988 | Aker et al. | |
| 7,438,781 B2 | 10/2008 | Ciambrone et al. | |
| 8,585,856 B1 | 11/2013 | Boone et al. | |
| 2006/0125155 A1* | 6/2006 | Sekido | B29C 70/443 264/511 |
| 2009/0263676 A1 | 10/2009 | Litzenberger et al. | |
| 2010/0012268 A1* | 1/2010 | Nobis | B29C 65/5057 156/285 |
| 2013/0048212 A1 | 2/2013 | Louie et al. | |
| 2013/0069286 A1* | 3/2013 | Heim | B29C 70/443 264/571 |
| 2013/0239586 A1 | 9/2013 | Parkin et al. | |

FOREIGN PATENT DOCUMENTS

WO   2012024023 A1   2/2012

OTHER PUBLICATIONS

Lavender CE PTY LTD, "Guide to Vacuum Bagging," Nov. 12, 2013, 3 pages, www.lavender-ce.com, Australia.
About.Com Composites/Plastics, "Vacuum Bagging: Basics," Nov. 13, 2013, 2 pages, www.composite.about.com.
Hexcel Corporation, "Redux Bonding Technology," Jul. 2003, 28 pages, Dublin, CA, USA.

(Continued)

*Primary Examiner* — George Koch
(74) *Attorney, Agent, or Firm* — Francis L. Conte (57) ABSTRACT

A bonding method includes vacuum bagging a second metal plate atop a first metal plate, with a thermosetting adhesive in a lap joint therebetween covered in turn by a porous peel ply and a porous breather ply; the plates being initially clamped together by applying vacuum through the breather ply; and thermally curing the adhesive, with the breather and peel plies being preselected to capture adhesive seepage from the lap joint and removed with the plies to correspondingly reduce cured adhesive flash.

19 Claims, 5 Drawing Sheets

(56) References Cited

OTHER PUBLICATIONS

Archer Daniels Midland Company, "EnvroStrip Wheat Starch," Jun. 2000, 10 pages, www.adm.com, Montreal, Quebec, Canada.
3M Aerospace and Aircraft Maintenance Department, "Scotch-Weld(TM) Structural Adhesive Film, AF 163-2, Technical Data Sheet," 21 pages, Nov. 2009, St. Paul, MN, USA.
Airtech Europe Sarl, "Selection Guide," May 29, 2012, 49 page excerpt, www.Airtech.LU, Luxemborg.
Airtech Advanced Materials Group, "Data Sheet, Airweave Non-Woven Polyester Breathers/Bleeders," Jul. 26, 2005, 5 pages, Huntington Beach, CA, USA.
Cytec Industries Inc., "Cytec Process Materials," Apr. 2013, 16 pages, Santa Fe Springs, CA, USA.
Northern Composites Inc., "Cytec A100/A100PS Peel Ply," Nov. 14, 2013, 4 pages, www.nfgsales.com, Greensboro, NC, USA.
Northern Composites Inc., "Cytec A-8888 Release Fabric," copyright 2012, 4 pages, www.nfgsales.com, Greensboro, NC, USA.
Airtech Advanced Materials Group, "Data Sheet, P.T.F.E. Coated Fiberglass Fabrics," Jul. 26, 2005, 2 pages, Huntington Beach, CA, USA.
Northern Composites Inc., "Precision Fabrics Group, Nylon Peel/Release Ply, Code 40000, Style 56180," Nov. 14, 2013, 2 pages, www.nfgsales.com, Greensboro, NC, USA.
Northern Composites Inc., "Precision Fabrics Group, Polyester Peel/Release Ply, Code 60001, Style 56009," Dec. 13, 2013, 2 pages, www.nfgsales.com, Greensboro, NC, USA.
Northern Composites Inc., "Precision Fabrics Group, Polyester Peel/Release Ply, Code 60005, Style 56116," Dec. 11, 2013, 2 pages, www.nfgsales.com, Greensboro, NC, USA.

\* cited by examiner

FLASH CONTROL METAL BONDING

BACKGROUND OF THE INVENTION

The present invention relates generally to aircraft manufacturing, and, more specifically, to adhesive metal bonding of components therein.

Aircraft typically included many parts and sections made from high strength aluminum for reducing weight. The aluminum parts are typically bonded together mechanically by fasteners and rivets, or by using high strength adhesive where appropriate.

Vacuum bagging is one method for adhesively bonding together metal components in contrast with its common use in fabricating composite laminates of fibers in a cured resin matrix.

In metal bonding, an adhesive film is applied between the metal parts and enclosed in a vacuum bag to clamp the parts together, and then the adhesive is thermally cured in a predetermined curing cycle typically conducted at elevated temperature and pressure for a specified time duration.

The initially solid adhesive film softens during thermal curing and decreases in viscosity as temperature rises. The softened adhesive may then leak from the bond area to form a small fillet or flash of cured adhesive extending outwardly from the bonded joint.

This cured flash may be undesirable in the aircraft part for its additional weight, or interference with adjoining parts, or simply for cosmetic appearance.

Removal of unwanted adhesive flash may therefore be accomplished by various post-bonding processes, which correspondingly require suitable equipment and labor which increase production time and cost. Such flash removal processes include sanding, grinding, scraping, and grit blasting with wheat-starch for example, and may adversely affect the corrosion protection of the underlying aluminum parts, which in turn requires rework to restore that corrosion protection.

In order to minimize flash during the vacuum bagging bonding of metal components, a specialized flashbreaker tape is available for locally masking the edge of the bond joint so that the adhesive leaks atop the tape, and may be simply removed after curing by removing or tearing away the tape and so captured flash.

Alternatively, a specialized pressure strip is also available to block adhesive seepage from the bond joint during curing.

However, since both products are specialized, their use increases complexity of the vacuum bagging process and correspondingly increases manufacturing cost, and may also have adverse effects.

For example, the flash is torn with the removal of the flashbreaker tape, and can leave an undesirable rough adhesive edge at the joint. And, the pressure strip merely dams the viscous adhesive as the metal parts are compressed during curing, with the full volume of the flash, and its weight, remaining in the bonded assembly.

Accordingly, it is desired to provide an improved vacuum bagging metal bonding process which reduces formation of undesirable flash during thermal curing.

BRIEF SUMMARY OF THE INVENTION

A bonding method includes vacuum bagging a second metal plate atop a first metal plate, with a thermosetting adhesive in a lap joint therebetween covered in turn by a porous peel ply and a porous breather ply; the plates being initially clamped together by applying vacuum through the breather ply; and thermally curing the adhesive, with the breather and peel plies being preselected to capture adhesive seepage from the lap joint and removed with the plies to correspondingly reduce cured adhesive flash.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
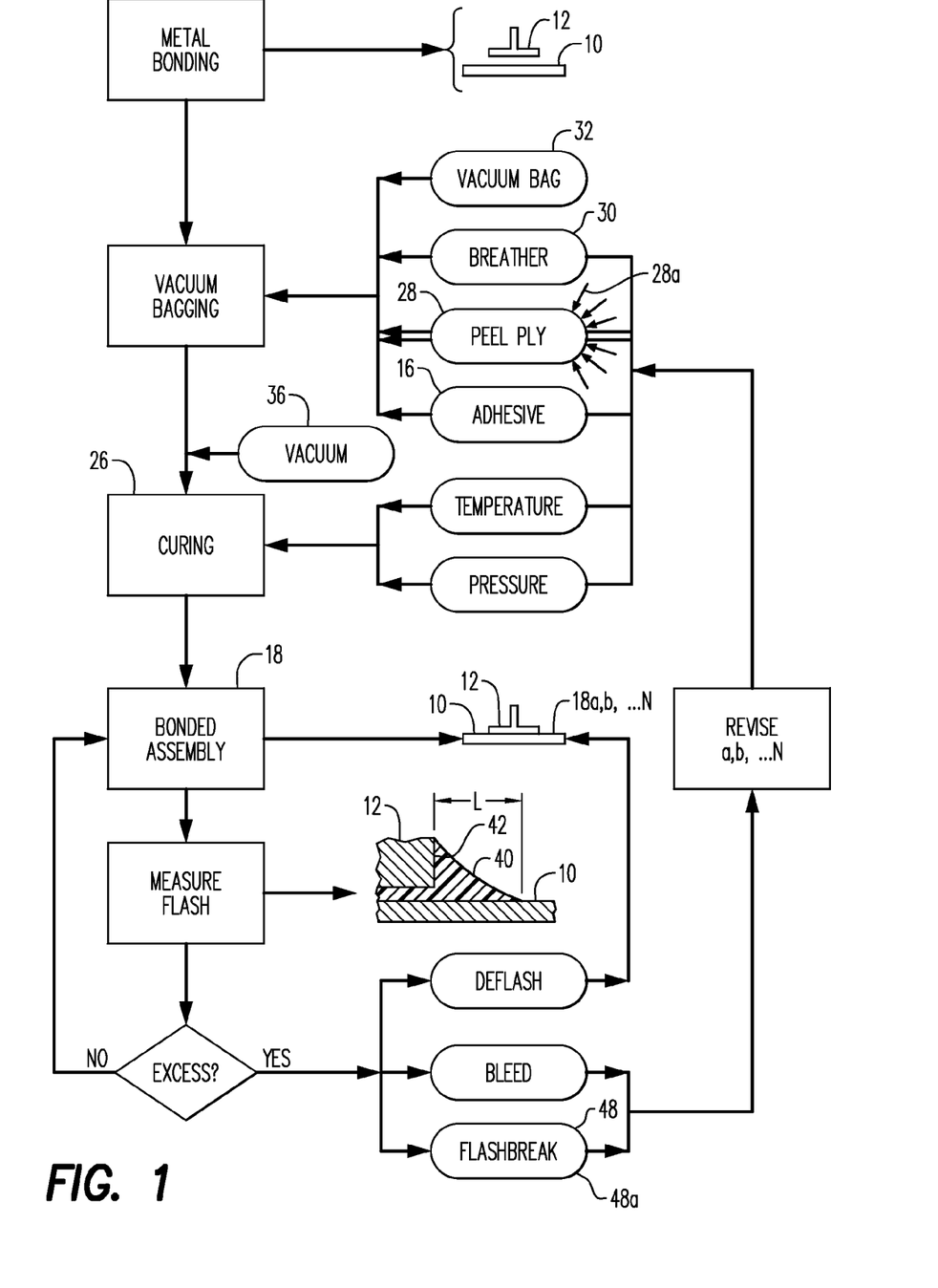
FIG. 1 is a flowchart for the improved method of adhesively bonding together metal components.

Illustrated schematically in FIG. 1 is method or process for adhesively bonding together two metal parts or components for an exemplary aircraft application.

Figure 2:
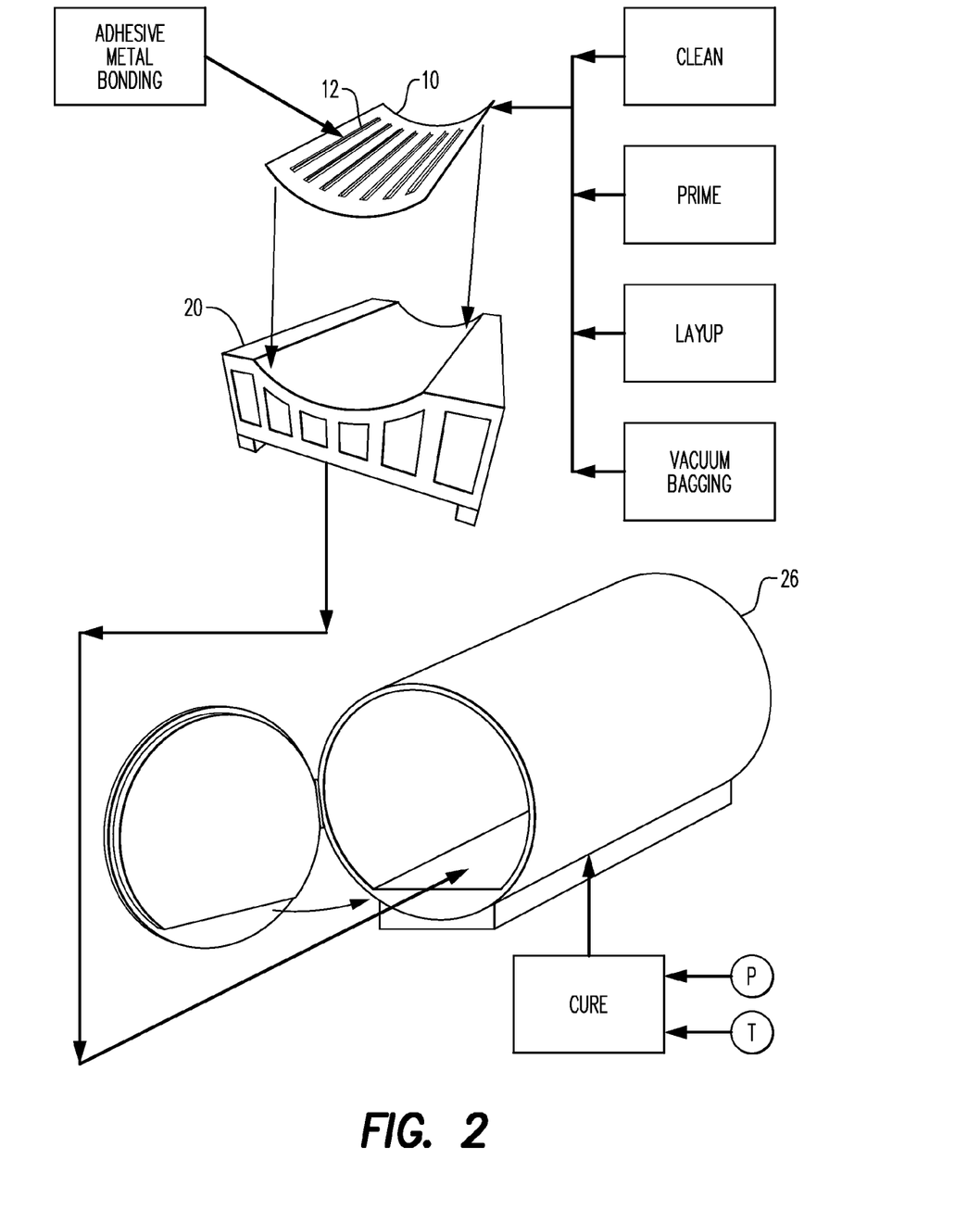
FIG. 2 is a flowchart for exemplary metal components being bonded using a vacuum bagging procedure.
Figure 3:
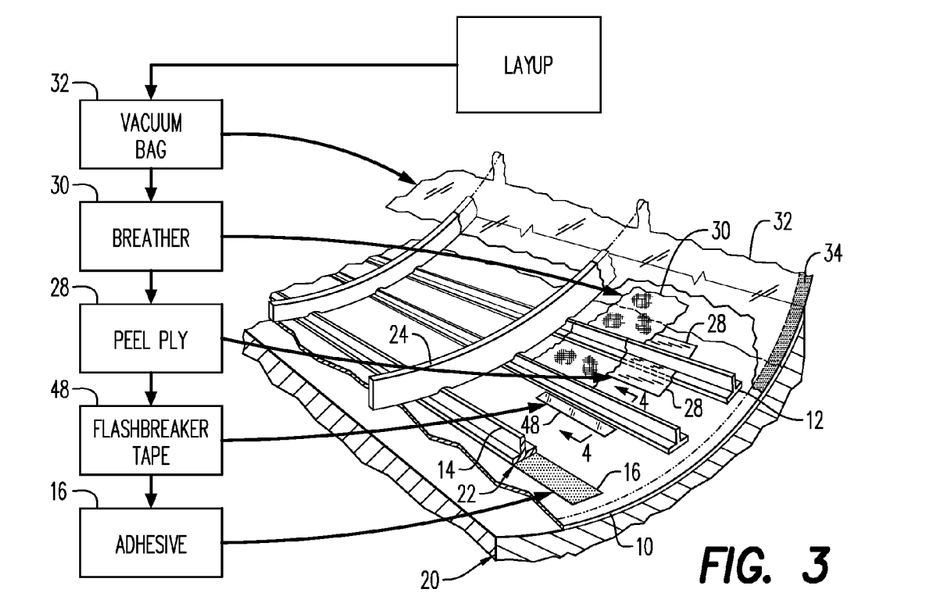
FIG. 3 is a flowchart showing exemplary details of the vacuum bagging procedure.

FIG. 1 illustrates schematically a first metal part 10 to which is adhesively bonded a second metal part 12. FIGS. 2 and 3 illustrate the first part 10 in the exemplary form of an aircraft fuselage skin or liner, typically formed of aluminum in a thin sheet metal plate configuration.

The first metal plate 10 is suitably curved in contour or radius both circumferentially and longitudinally to form a portion of the aircraft fuselage which is tubular along its longitudinal axis, with radius decreasing toward the aft tail end thereof.

The second part 12 is in the exemplary form of an elongate stringer or rib, several of which are adhesively bonded to the inner surface of the first plate 10 and spaced circumferentially apart and extending longitudinally to provide structural support to the thin skin or liner.

The second part 12 is similarly formed of aluminum in a longitudinally elongate thin plate form as required for the specific aircraft structural application. In the exemplary embodiment illustrated in FIG. 3, the second metal plate 12 has an integral vertical flange 14 extending perpendicularly therefrom in a collective T-shaped transverse cross section.

Alternatively, the second plate 12 could have any suitable configuration, such as a hat or box transverse section, as desired for increasing strength in the bonded assembly with the supporting first plate 10.

The two metal plates 10,12 are merely representative of any two metal components of suitable metal composition and configuration which are adhesively bonded together at opposing surfaces.

The bonding method illustrated in FIG. 1 utilizes vacuum bagging in a special procedure to initially clamp under vacuum pressure the several metal stringer plates 12 against the inner surface of the aircraft liner plate 10, with a suitable high strength structural adhesive 16 disposed therebetween.

The adhesive 16 is typically a thermosetting epoxy which undergoes suitable thermal curing to form an integrally bonded assembly 18 of the several stringer plates 12 atop the common liner plate 10.

As shown in more detail in FIG. 2, the bonding method begins by suitably cleaning the first and second metal plates 10,12, and then applying a suitable bond primer thereto for providing corrosion resistance or protection for the exemplary aluminum material used in the aircraft application.

The cleaned and primed first plate 10 is supported atop a corresponding mold 20 in the form of a fixture table having a concave top mold surface which is complementary to and matches the convex bottom surface of the first plate 10. In this lay-up procedure, the bottom surface of the first plate 10 rests directly atop the top surface of the mold 20 to ensure full surface contact of the several stringer plates 12 resting atop the concave top surface of the first plate 10.

As shown in FIG. 3, the individual stringer plates 12 are accurately positioned by hand atop the first plate 10 in the lay-up procedure, with the thermosetting adhesive 16 being disposed between the opposing surfaces thereof to form corresponding bond or lap joints 22.

The lap joints 22 preferably extend both laterally and longitudinally along the full width and length of the individual stringer plates 12, and are defined by the opposing top and bottom surfaces of the plates 10,12 which have been initially cleaned and primed prior to applying the thermosetting adhesive, which may be first applied to the bottom surface of each stringer plate 12 before being positioned atop the liner plate 10.

Each stringer plate 12 is accurately positioned atop the liner plate 10 as required for the specific bonded assembly 18, and arcuate header ribs 24 may be joined to the several stringer plates 12 to ensure accurate alignment and location thereof.

FIGS. 1-3 further illustrate schematically a vacuum bagging procedure or process which is used to initially clamp the second plates 12 atop the common first plate 10 for maintaining the accurate lay-up alignment therebetween.

As shown in FIG. 2, the vacuum bagged assembly of the plates 10,12 are supported atop the mold 20 and collectively transported, by forklift for example, into a conventional autoclave 26. The autoclave 26 provides pressure (P) and heat to thermally cure the adhesive between the metal plates in a predetermined temperature (T) cycle as specified for the particular adhesive being used.

Vacuum bagging is a conventional process that uses a vacuum bag under negative vacuum pressure to typically compress together fibrous laminates impregnated with a suitable resin matrix for being thermally cured to form a hardened composite laminate.

Since such laminates are saturated with resin, the conventional vacuum bagging procedure requires suitable release liquids or films and peel plies to prevent bonding of the laminate to the supporting mold and vacuum bag itself. A breather ply is also required to allow vacuum to reach the entire surface of the laminate to uniformly draw out trapped air and volatiles for achieving a low void content in the cured hard composite laminate being molded.

However, metal-to-metal adhesive bonding is substantially different than composite laminate manufacture since the metal is already solid and impervious to gas flow unlike flexible fibrous laminates, and bonding adhesives are materially different than matrix resins used to form the cured laminate, and are used only locally to form bonds between the solid metal components.

Accordingly, only selected features and materials from conventional vacuum bagging procedures are desired for adhesively bonding together metal components while minimizing complexity and cost.

As initially shown in FIGS. 1 and 3, the lay-up procedure includes accurately positioning the several stringer plates 12 atop the common supporting plate 10, with the adhesive 16 being disposed therebetween.

Figure 4:
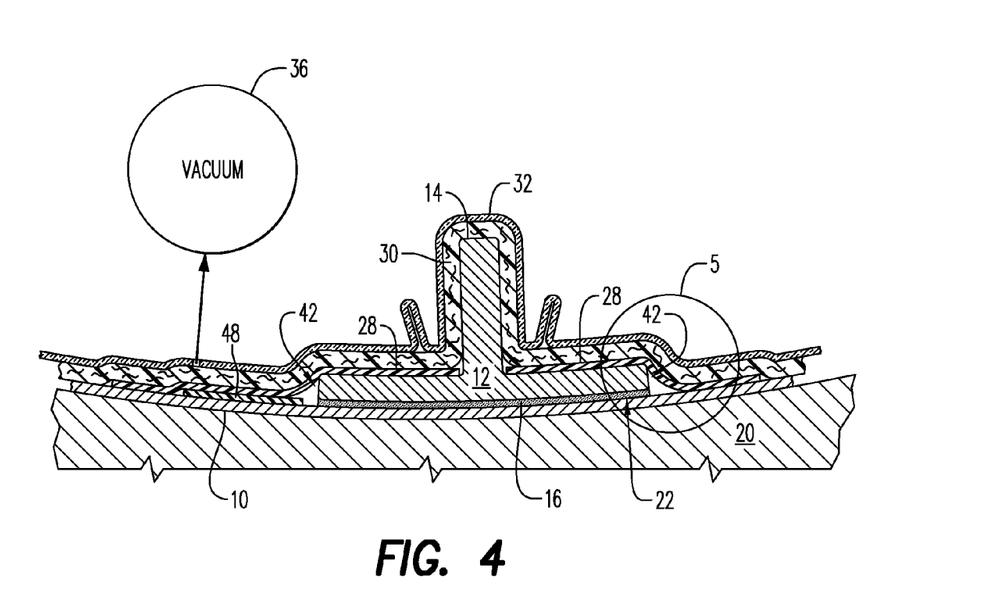
FIG. 4 is a transverse sectional view through an exemplary bond joint for the metal components being adhesively bonded in FIG. 3, and taken along section line 4-4.

As shown in detail in FIGS. 3 and 4, the vacuum bagging procedure then introduces a porous peel ply 28 covering the entire lap joint 22, and a porous breather ply 30 covering the peel ply 28 for each of the several stringer plates 12.

A conventional vacuum bag 32 is sealingly joined by sealant tape 34 around the full perimeter thereof to the first plate 10 to cover the breather and peel plies 30,28 and the second plate 12. The peel ply 28 is locally used in individual strips to cover the several lap joints 22 along the opposite lateral edges of the several stringer plates 12 where the edges of the adhesive 16 are exposed. Note that the upstanding T-flanges 14 need not be covered with the peel ply 28, which peel ply 28 instead preferably terminates at the base thereof.

The breather ply 30, in contrast, extends the full extent or area of the first plate 10 on which the several stringer plates 12 are mounted, and also covers in common all the individual peel plies 28, as well as the upstanding T-flanges 14. The breather ply 30 conforms in extent and area with that of the vacuum bag 32 for ensuring vacuum flow across the full area of the vacuum bag 32 to its bonded perimeter atop the liner plate 10.

The vacuum bag 32 is conventionally connected by hose to a vacuum pump 36 shown schematically in FIGS. 1 and 4 for applying a vacuum, or negative pressure, through the breather ply 30 to clamp the several second plates 12 atop the common first plate 10. In this way, the lay-up assembly of stringer plates 12 atop the common liner plate 10 may be accurately retained fixed in location during transport into the autoclave 26 for thermal curing.

In the autoclave 26 illustrated schematically in FIGS. 1 and 2, heat and pressure are introduced to thermally cure the adhesive 16 to adhesively bond the second plates 12 to the common first plate 10 at the corresponding lap joints 22. Each stringer plate 12 is therefore adhesively bonded along its entire lower surface to the corresponding upper surface of the common liner plate 10 in a full-lap bond joint 22 having maximum bonding area for increasing strength and stiffness of the collective liner assembly.

Figure 5:
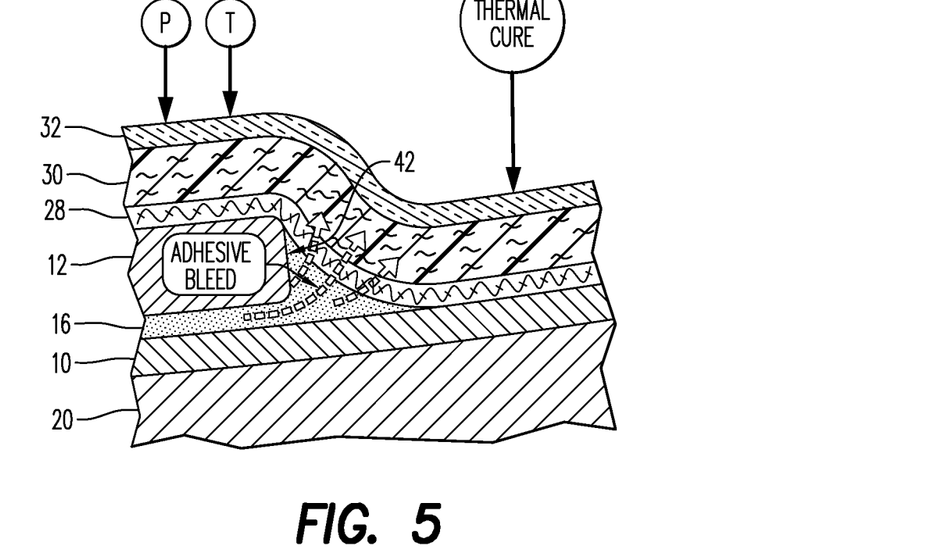
FIG. 5 is an enlarged sectional view of a portion of the bond joint illustrated in FIG. 4 within the circle labeled 5 during thermal curing.
Figure 6:
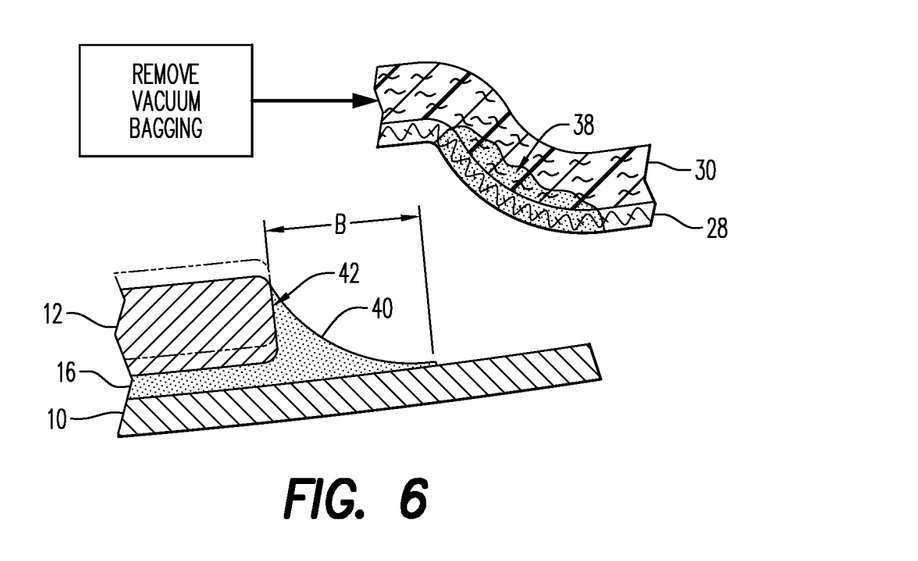
FIG. 6 is an exploded view of the bond joint shown in FIG. 5 after thermal curing.

As best shown in FIGS. 5 and 6, the vacuum bagging procedure is specifically tailored with the breather and peel plies 30,28 being preselected to capture adhesive seepage 38 that flows or bleeds as a viscous liquid from the lap joints 22 during thermal curing to correspondingly reduce cured adhesive flash 40 exposed on the first plate 10 at the perimeter edges of the second plates 12. This flash 40 forms a visible concave adhesive fillet around the perimeter of each plate 12 that visibly confirms complete surface bonding thereof to the common liner plate 10.

By manually removing the breather and peel plies 30,28 from atop the first and second plates 10,12 after thermal curing, the captured, and now cured, adhesive seepage 38 is removed therewith. This removal of a significant portion of the adhesive seepage may be used to preferentially reduce the size of any remaining flash or fillet 40 for reducing overall weight of the bonded assembly 18, and eliminating the need for post-processing deflashing of the assembly.

In the transverse cross section of the adjoining plates 10,12 shown in FIGS. 4 and 5, each of the several second plates 12 terminates along both lateral edges at a corresponding right-angled step 42 atop the common first plate 10 to expose the adhesive otherwise hidden at the joint 22. Since both plates 10,12 are solid metal, they entrap the adhesive 16 therebetween, with the only exposure of the adhesive 16 being solely along the opposite perimeter steps 42 where the stringer plates 12 terminate atop the common liner plate 10.

The peel ply 28 is locally applied directly atop both the first and second plates 10,12 in a bridge therebetween that drapes over and closely conforms with the right-angled step 42 directly adjacent to the exposed adhesive 16 in the joint 22. The peel ply 28 is typically resilient and thusly forms a small void at the step 42.

During thermal curing, excess adhesive 16 discharges from the joint 22 into the void at the step 42 and is readily visible. Accordingly, adhesive seepage from the entire perimeter of the lap joint 22 can be readily observed to correspondingly ensure complete adhesive bonding over the full surface area of the stringer plate 12 atop the common liner plate 10.

The peel ply 28 is preselected in material definition or characteristics including material composition and porosity for locally channeling or bleeding to the breather ply 30 the adhesive seepage 38 along the step 42 during thermal curing.

Placing the mold 20 and vacuum bagged first and second plates 10,12 in the autoclave 26 permits thermal curing of the adhesive 16 under heat and pressure for effecting suitable viscous seepage thereof from the joint 22, However, suitable viscous seepage through the peel ply 28 into the breather ply 30 may be obtained only by preselecting the peel ply 28 in combination with the adhesive 16, breather ply 30, curing temperature T, and curing pressure P.

Peel and breather plies in general have specific material definitions or characteristics including material compositions, properties, and performance characteristics as specified by their manufacturers, and are correspondingly different as required for different methods for their use.

Similarly, thermosetting adhesives also have specific material definitions or characteristics including material compositions, properties, and performance characteristics as specified by their manufacturers, and are correspondingly different as required for different methods for their use. And, each thermosetting adhesive is also subject to a specified or predetermined thermal curing cycle including pressure, temperature, and duration.

All these material and curing variables can therefore affect performance of thermal bonding of metals using vacuum bagging procedures.

Further complicating bonding performance for aircraft grade structural metals are design specifications mandated therefor by the aircraft manufacturer after conducting extensive design and development of all components of the typical aircraft being designed.

Acceptable adhesive metal bonding is dependent on the specific metal parts being bonded for different applications in different aircraft. The acceptability of adhesive flash is similarly dependent on the particular metal parts and aircraft applications.

Accordingly, design constraints are typically imposed by the airframer on subcontractors in manufacturing the various sub-assemblies of an aircraft, including those requiring adhesive bonding of metal components.

One exemplary design constraint imposed upon the fabricator is the thermosetting adhesive 16 specified by the airframer for bonding the specified parts.

In one aircraft manufacturing development program, the stringer plates 10 and liner plate 12 were adhesively bonded together in an original bonding method constrained by the airframer, which included vacuum bagging using an original peel ply 28a in the combination shown schematically in FIG. 1 to produce an initial bonded assembly 18a.

The size, including length L and optionally thickness, of the flash 40 is measured atop the first plate 10 along the step 42 in the initial bonded assembly 18a. If the flash size is not excessive for a specific design application, then the original bonding method is acceptable.

However, if the flash size is excessive, remedial action would be required to reduce flash size.

Figure 7:
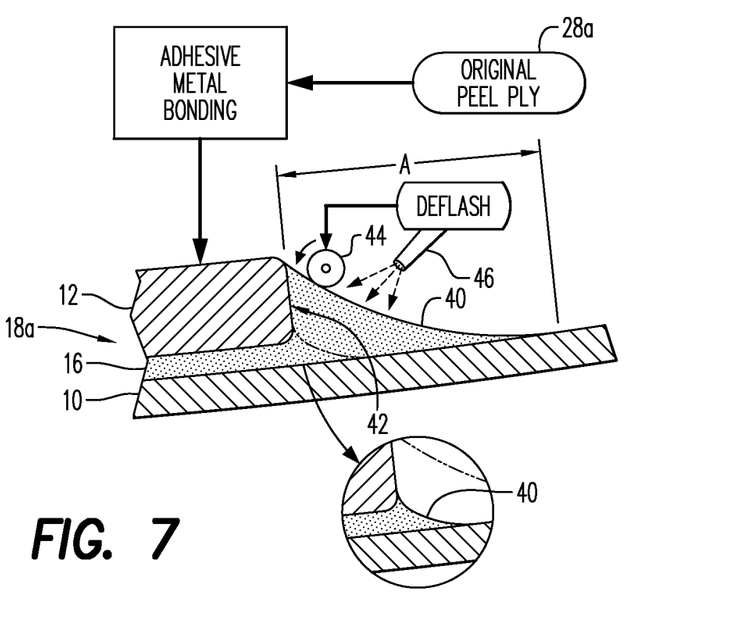
FIG. 7 is an enlarged sectional view showing an original adhesive bond joint undergoing deflashing.

For example, FIG. 7 illustrates two conventional post-bonding processes that can be used for removing excessive flash 40. In the original bonding method, the flash 40 had a length A measured laterally outwardly from the second plate 12 of about 150 mils (3.8 mm) which was deemed excessive in accordance with the design constraints.

Excessive flash can be formed for various reasons in the bonding process and is dependent on the various materials used therein. As the excess adhesive is discharged from the bond joint it can readily displace the overlying peel ply at the step 42 to form the excessive flash length L directly under that peel ply.

In one conventional deflashing process, a hand grinder 44 may be used to grind away the excessive flash 40 along the steps 42 adjoining the bonded joint. If bare metal is exposed by the grinding, it is suitably cleaned and re-primed to restore corrosion resistance.

Alternatively, deflashing may be accomplished by using a conventional wheat-starch grit blasting apparatus 46 to remove excessive flash without damaging the underlying corrosion protection.

However, preferentially revising the metal bonding method was conducted during the development program in an attempt in the first instance to avoid excess flash without the need for any post-bonding deflashing.

FIG. 1 illustrates schematically several revisions conducted during the development program, including revising the bonding method for a second set of the first and second plates 10,12 to include at least one method difference in the vacuum bagging process and thermal curing for evaluating possible solutions for flash control and amelioration.

The revised bonding method adhesively bonded together the second set of first and second plates 10,12 to produce a second bonded assembly 18b.

Flash size was again measured atop the first plate 10 along the step 42 in the second bonded assembly 18b.

The measured flash 40 in the second bonded assembly 18b may then be compared with the measured flash 40 in the initial bonded assembly 18a to evaluate whether or not the so revised bonding method may be effective at significantly reducing flash size.

The bonding method was then revised sequentially with corresponding method differences to produce corresponding bonded assemblies 18a, b, . . . N, until the measured flash in the revised bonding method for the last (18N) bonded assembly was suitably less than measured flash in one or more of the previous bonding methods.

For example, FIG. 6 illustrates a bonding iteration in which the length B of the produced flash 40 was suitably reduced from the original length A, from about 150 mils (3.8 mm) to about 80 mils (2.0 mm), with the reduced size being deemed non-excessive for the specific metal-to-metal bond application.

The exemplary development program therefore uncovered a suitable peel ply 28 from the many different peel plies tested which was effective for avoiding or replacing the otherwise required deflashing post-operation following thermal curing of the adhesive 16 in a tailored metal bonding method for the first and second plates 10,12. The so uncovered satisfactory peel ply 28 is therefore different than the originally tested peel ply and may therefore be subsequently used as the proven and so preselected peel ply.

Although the bonding method could be revised in different applications to change any one or more of the peel ply 28, breather ply 30, or adhesive 16 and its corresponding temperature and pressure curing cycle, revision of the peel ply itself has proven particularly effective for bleeding therethrough viscous adhesive, notwithstanding the constraints imposed by the airframer, including the unpermitted change of the specified thermosetting resin.

Accordingly, one preferred bonding method difference proven by development testing includes replacing the original peel ply 28a with a different peel ply 28 having different material definition defined by its material properties or characteristics.

In one configuration, only the peel ply difference is revised in the sequential bonding methods shown in FIG. 1 by sequentially testing the performance of a sequence of different peel plies having different material definitions or properties to evaluate flash amelioration without otherwise degrading vacuum bagging bonding of the metal plates 10,12.

As indicated above, flashbreaker tapes are conventionally known for masking flash, but at a corresponding increase in bonding complexity and cost.

Flash control and reduction as disclosed above may still leave some flash along the bonded joint, which may still be excessive and unacceptable for local regions of the bond joint which might have close dimensional tolerances for accommodating adjacent components in the aircraft construction.

Accordingly, the revised bonding method may optionally further include applying a masking flashbreaker tape 48 directly atop the first plate 10 along the step 42 adjacent to the exposed adhesive 16 prior to placement of the peel ply 28. FIG. 1 schematically illustrates this revision in the bonding method in combination with the preferred revision of the peel ply 28.

FIG. 3 illustrates the exemplary local use of the flashbreaker tape 48 on one side of one stringer plate 12 for a limited portion of the length thereof, with FIG. 4 showing the transverse section thereof. The amount of flashbreaker tape can be minimized as desired depending upon the particular design and particular need for minimum flash production in the bonded metal parts.

Since the flashbreaker tape 48 locally adjoins the lap joint 22 and is directly applied atop the liner plate 10, the peel ply 28 is in turn directly applied atop the flashbreaker tape 48, when such tape 48 is used in the step, and the peel ply 28 extends laterally oppositely from the step directly atop both the first and second plates 10,12 in the lateral bridge thereacross.

Figure 8:
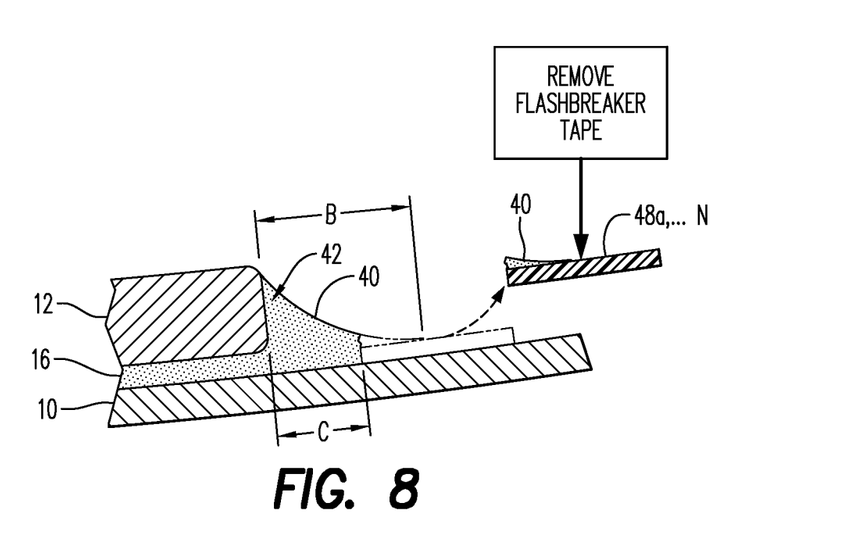
FIG. 8 is an enlarged section view of the bond joint in an alternate embodiment using flashbreaker tape for removing cured flash after thermal curing.

The flashbreaker tape 48 is preferentially located typically at a suitable setback distance C of about 60 mils (1.5 mm) from the edge of the stringer plate 12 as shown in more detail in FIGS. 4 and 8.

The flashbreaker tape 48 is relatively thin and allows seepage thereover of the viscous adhesive 16 oozing from the lap joint 22 during thermal curing. During curing, the adhesive 16 viscously flows or seeps both atop the flashbreaker tape 48 and through the peel ply 28 at the step 42.

By then removing the breather and peel plies 30,28 after adhesive curing, the captured adhesive seepage 38 is removed therewith as shown in FIG. 6. By additionally removing the flashbreaker tape 48, the flash 40 deposited thereon is torn from the cured adhesive 16 in the joint 22 as shown in FIG. 8.

The setback distance C of the flashbreaker tape 48 ensures that only the terminating thin portion of the cured adhesive flash 40 atop the tape 48 is torn away from the thicker portion of the torn flash 40 remaining in the step 42 as a truncated or torn adhesive fillet which has a correspondingly shorter length C matching the setback distance C. And, leaving only thin flash 40 atop the tape 48 reduces the tearing load or strength capability required for that tape 48.

In this way, the flash 40 can be further reduced in size from its ablated size or length B to the exemplary setback distance or length C where locally desired or required, with that local size C being suitably less than the ablated size B.

Although flashbreaker tapes are conventional, they are also commercially available with different material definitions defined by their material composition, properties, and characteristics, and at different costs.

FIG. 1 illustrates schematically that the revised bonding method may additionally include using some form of flashbreaker tape 48, but synergies may be obtained by using such tape in combination with the revised peel ply.

An original flashbreaker tape 48a may be applied atop the first plate 10 along the step 42 adjacent to the exposed adhesive 16 in the original bonding method for masking the first plate 10 from the flash 40 in the manner illustrated in FIGS. 4 and 8.

In FIG. 1, the bonding method difference may additionally include replacing the original flashbreaker tape 48a with a different flashbreaker tape 48 having different material definitions or characteristics. In particular, since adhesive seepage is bled through the revised peel ply 28 and captured in the cooperating breather ply 30, less flash can form atop the flashbreaker tape, and therefore that tape can be replaced with one having strength suitable for supporting less flash, while allowing complete removal thereof without breaking or leaving remnants atop the first plate 10.

Accordingly, the revised bonding method may achieve advantages in synergy wherein both the peel ply 28 and flashbreaker tape 48 are together revised to uncover different species or variations thereof effective in combination. In this embodiment, only the peel ply and flashbreaker tape differences are revised in the sequential bonding methods, while the other possible variables remain the same or constant during the revision process.

In one revision combination of peel ply and flashbreaker tape uncovered during development, the original length A of flash was reduced from about 150 mils (3.8 mm) to about 80 mils (2.0 mm) due to ablation capture around each stringer plate 12, and further reduced locally to about 60 mils (1.5 mm) at the flashbreaker tape locations, which size reductions are sufficiently small for meeting exemplary airframer specifications.

The use of the flashbreaker tape 48 is optional as desired for further reducing excessive flash where desired, especially in local regions of the bond joint 22 between the two metal plates 10,12.

In one of its simplest forms, the metal bonding method varies or revises solely the peel ply 28 as described above to uncover and select a particular species of peel ply from the many species commercially available, which uncovered species can in fact reduce the formation of excessive flash during thermal curing.

The metal bonding method also enjoys the advantages of using in the minimum a single peel ply 28 in the vacuum bonding procedure applied directly atop the first and second plates 10,12 to conform with the step 42. In further combination, a single breather ply 30 is applied directly atop the single peel ply 28. And, the vacuum bag 32 is then sealingly joined around the perimeter thereof to the supporting first plate 10 to directly cover in turn the breather and peel plies 30,28 and the full complement of second plates 12 in the particular design application.

Particularly significant in the bonding of the metal first and second plates 10,12 is that they are solid and imperforate at the lap joint 22, with the thermosetting adhesive 16 therein being exposed solely along the steps 42 which bound the perimeter of the stringer plates 12. The adhesive 16 is thus exposed solely at the steps 42 and is physically constrained by the bounding metal plates 10,12 for locally seeping solely at the steps 42 and then directly through the covering peel ply 28.

As described above, development testing has been conducted to uncover revised metal bonding methods which can in fact reduce excessive flash during thermal curing, without otherwise adversely affecting the bonding process or bond strength or requiring post-bonding rework of the workpieces.

Since thermal curing is dependent on the specific thermosetting adhesive used for bonding the metal workpieces, the bonding method is necessarily revised specifically for any different thermosetting adhesive to uncover whether or not excessive flash could in fact be reduced using commercially available vacuum bagging materials, or whether custom designed materials would be effective.

EXAMPLE 1

In the exemplary embodiment disclosed above, both the first and second metal plates 10,12 comprise aluminum specifically configured for the several structural stringers 12 being bonded to the inner surface of the fuselage liner or skin 10.

The specific thermosetting adhesive 16 was specified by the airframer as comprising 3M™ SCOTCH-WELD™ Structural Adhesive Film AF 163-2K commercially available from 3M Aerospace and Aircraft Maintenance Department, St. Paul, Minn. This product is a thermosetting modified epoxy structural adhesive in film form including 7.5-13 mil (0.19-0.33 mm) thickness and 0.045-0.085 Lb/ft$^2$ (220-415 g/m$^2$) weight species.

In particular, the 0.060 Lb/ft$^2$ (293 g/m$^2$) weight species of the AF 163-2K adhesive film was specified, and thereby predetermined, by the airframer, with a corresponding nominal film thickness of 9.5 mils (0.24 mm).

A predetermined thermal and pressure curing cycle is also specified by the manufacturer of the adhesive, as well as by the airframer.

For example, the thermal curing cycle for the predetermined AF 163-2K adhesive film may be conducted in the autoclave 26 under a pressure of 50 psi (345 kPa), after relieving the initial vacuum in the vacuum bag 32. The adhesive is heated to about 240 degrees F. (116 degrees C.) with a rise rate of 2-4 degrees F. per minute (1.1-2.2 degrees C. per minute) for a total cure time at temperature of 90 minutes.

In the original iteration of the bonding method, the breather ply 30 was Airtech AIRWEAVE® N10 heavy weight nonwoven polyester fiber breather/bleeder, 10 oz./yd$^2$ (339 g/m$^2$), commercially available from Airtech Advanced Materials Group, Huntington Beach, Calif. or its division, Airtech Europe Sarl, Luxembourg, through its U.S. distributors.

The original peel ply 28a tested was Airtech Release Ply Super F non-coated polyester fabric having a 6.5 mil (0.165 mm) thickness, 114 g/m$^2$ weight, and fabric construction in warp by fill of 354×252 ends/dm× picks/dm, similarly commercially available from Airtech through its U.S. distributors.

As indicated above, this combination of adhesive, peel ply, and breather ply resulted in excessive flash 40 at the bond joints 22 of about 150 mils (3.8 mm), and up to about 210 mils (5.3 mm), and would require post-bonding deflashing to remove the flash.

After many iterations or revisions of the peel ply in the bonding method shown in FIG. 1, an acceptable peel ply 28 was uncovered to complement the 3M™ AF 163-2K (0.060 Lb/ft$^2$ (293 g/m$^2$) weight species) adhesive ply 16 and Airtech N10 breather ply 30, in the species of Cytec A100 white medium weight nylon woven fabric, 6.0 mils (0.152 mm) thickness, 2.2 oz/yd$^2$ (75 g/m$^2$) weight, commercially available from Cytec Industries, Inc, Cytec Process Materials, Santa Fe Springs, Calif. through its U.S. distributors.

The A100 peel ply 28 was effective in the bonding method combination described above to reduce the length of the ablated flash 40 to about 80 mils (2 mm).

EXAMPLE 2

Another one of the revisions in the bonding method uncovered another acceptable peel ply 28 in the species of another commercially available, from Cytec Industries, Inc. of Santa Fe Springs, Calif., Cytec product known as Cytec A8888 green medium weight nylon open-weave woven fabric, 4.5 mil (0.114 mm) thickness, 2.2 oz/yd$^2$ (75 g/m$^2$) weight, coated with heat cured silicone release solution, also effective in combination with the 3M™ AF 163-2K (0.060 Lb/ft$^2$ (293 g/m$^2$) weight species) adhesive 16 and the Airtech N10 breather ply 30 for suitably reducing size of the flash 40 after thermal bonding.

The Cytec A8888 peel ply is easier to apply during lay-up and easier to remove after adhesive curing than the Cytec A100 peel ply.

These two peel plies Cytec A100 and Cytec A8888 have demonstrated the capability of effectively reducing size of the flash in combination with the 3M™ AF 163-2K (0.060 Lb/ft$^2$ (293 g/m$^2$) weight species) adhesive and Airtech N10 breather in the revised metal bonding method, in contrast with many other peel ply species also tested in the many revisions.

Since many species of pre-existing peel plies and release plies are commercially available from many different manufacturers for use in vacuum bagging of resin impregnated fibrous laminates, they may be evaluated and tested for any efficacy in the different use for adhesive metal bonding to specifically reduce flash size as disclosed herein. Or custom tailored materials, including peel plies, may be newly developed for specifically reducing flash size in adhesive metal bonding.

The Airtech company identified above commercially offers for purchase many types of release fabrics and peel plies made from nylon, polyester and fiberglass for correspondingly different performance, along with many types of breather and bleeder materials.

The Cytec company also identified above commercially offers for purchase many additional types of release fabrics and peel plies made from nylon, polyester, and fiberglass for correspondingly different performance, along with many types of breather materials.

And, other companies also offer for sale further species of breather and bleeder materials, peel plies and release fabrics.

Accordingly, numerous commercially available vacuum bagging materials are available for evaluation and testing for determining whether or not they could be specifically effective for reducing flash in adhesive metal bonding as described herein without otherwise degrading the bonding method, or the resulting adhesive bond.

Fundamental to uncovering an effective peel ply for use in vacuum bagging adhesive bonding of metal components is the ability of the peel ply to cooperate with the specific thermosetting adhesive and thermal cure cycle in conjunction with the covering breather ply for preferentially bleeding or ablating viscous adhesive locally from the small bond joint 22 and into the breather ply 30 for subsequent removal after thermal curing.

The peel and breather plies 28,30 must cooperate for capturing adhesive seepage, which captured seepage is then thermally cured therein for removal therewith after thermal curing.

The removal process is simply accomplished by first removing the bonded assembly 18 and supporting mold 20 from the autoclave 26. The vacuum bag 32 is first removed from the bonded assembly, followed by removal of the breather ply 30 and the underlying peel ply 28 partly bonded thereto by the cured seepage 38, as shown in relevant portion in FIG. 6.

The cured seepage is torn from the cured adhesive 16 in the bond joint 22, and thusly resists removal of the breather and peel plies 30,28.

Accordingly, the peel ply 28 is preferably further evaluated for tear resistance with the captured adhesive seepage to avoid undesirable tearing of the peel ply 28 itself upon removal of the breather and peel plies 30,28 after thermal curing of the adhesive.

Excessive tearing of the peel ply 28 will leave remnants thereof still attached to the liner plate 10 by the cured adhesive seepage. Post-bonding rework would then be required to remove any such remnants, which would delay the fabrication process, and correspondingly increase cost.

EXAMPLES 3 AND 4

As indicated above, the revised peel ply 28 may be used in conjunction with the flashbreaker tape 48 for providing synergistic reduction in flash, with corresponding reductions in material and process costs.

The original flashbreaker tape 48a tested was 3M High Temperature Nylon Tape 855, 2 mil (0.051 mm) thick nylon film tape with a non-silicone rubber adhesive, commercially available from 3M Industrial Tape and Specialties Division, St. Paul, Minn.

This 3M 855 tape did not adhere adequately, was fragile, and difficult to remove after thermal curing of the overlying adhesive flash.

Another flashbreaker tape 48b tested was BA 1844, 2 mil (0.051 mm) polyester film tape with a high temperature resistant rubber based pressure sensitive adhesive tape, commercially available from Bron Aerotech, Denver, Colo.

This Bron BA 1844 tape was too fragile for effective use.

One revised flashbreaker tape 48c tested was Airtech FLASHBREAKER® 2R, 2 mil (0.051 mm) polyester film coated with a 2 mil (0.051 mm) pressure sensitive rubber based adhesive, and commercially available from Airtech Advanced Materials Group, Huntington Beach, Calif. or its division, Airtech Europe Sarl, Luxembourg, through its U.S. distributors.

Another revised flashbreaker tape 48N tested was Airtech FLASHBREAKER® 5R, 5 mil (0.127 mm) polyester film coated with a 2 mil (0.051 mm) pressure sensitive rubber based adhesive, and commercially available from Airtech Advanced Materials Group, Huntington Beach, Calif. or its division, Airtech Europe Sarl, Luxembourg, through its U.S. distributors.

These selected flashbreaker tapes 48c,N were effective for removing excess flash without unacceptable tearing of the tapes that could leave behind remnants requiring additional removal work.

EXAMPLES

Breathers

In addition to the Airtech N10 breather described above, other breather or bleeder plies tested included Ozenberg Style 1942, an open weave cotton material, commercially available; and Mochburg Style 2024, a random polyester fiber mat, commercially available.

EXAMPLES

Peel Plies

Additional peel plies tested include the Airtech Release Ply Super F described above as well as:

1. Airtech Release Ease 234TFP-1, an open weave thin (1 mil, 0.025 mm) porous PTFE (TEFLON®) coated fiberglass fabric, commercially available from Airtech as identified above.

2. PFG Code 40000, Style 56180 FIN 060-NAT, an 8 mil (0.20 mm) nylon fiber release or peel ply, 125.4 g/m$^2$ weight, commercially available from Precision Fabrics Group through U.S. distributors.

3. PFG Code 60001, Style 56009 FIN 060-NAT, a 5 mil (0.13 mm) polyester fiber release or peel ply, 84.8 g/m$^2$ weight, commercially available from Precision Fabrics Group through U.S. distributors.

4. PFG Code 60005, Style 56116 FIN 060-NAT, a 6 mil (0.15 mm) polyester fiber release or peel ply, 108.5 g/m$^2$ weight, commercially available from Precision Fabrics Group through U.S. distributors.

EXAMPLE

Adhesive

Although the 3M AF 163-2K adhesive film described above was required by the airframer, another adhesive 16b was additionally tested for enhancing performance: in particular, 3M™ SCOTCH-WELD™ Structural Adhesive Film AF 163-3M commercially available from 3M Aerospace and Aircraft Maintenance Department, St. Paul, Minn. This product is a thermosetting modified epoxy structural adhesive in film form having 5.5 mil (0.14 mm) thickness and 0.030 Lb/ft$^2$ (146 g/m$^2$) weight.

Many combinations of the above listed breathers, bleeders, peel plies, and adhesives were tested for exploring benefits and disadvantages thereof.

Reference tests were conducted without any peel ply in which an impervious film was placed between the adhesive and breather resulting in maximum excess flash substantially greater than with a peel ply.

One, two, and three plies of the release or peel materials were tested.

One and two plies of different release or peel materials were also tested.

Most testing was conducted with the common Airtech N-10 breather identified above, but different breather plies were also tested in one, two, and three plies.

Most testing was conducted with the common 3M AF 163-2K adhesive identified above, but a different adhesive was also tested.

In particular, the 3M AF163-3M adhesive identified above failed to provide sufficient viscous flow during thermal curing resulting in unacceptable variation in flash size including invisible flash locations, which in turn failed to visibly confirm complete bonding of the lap joint.

Various disadvantages of these many combinations of testing include fundamentally the failure to effectively reduce excess adhesive flash.

Some tests showed unacceptable variability in size of the flash or fillet along the perimeter edges.

Some tests had local hidden flash in which no excess adhesive was discharged, and therefore visible confirmation of a complete adhesive bond could not be established.

The multiple plies of release or peel and breather plies increased complexity of the vacuum bagging bonding process, and associated cost, without suitable benefit.

And, some tests had unacceptable tearing of the peel ply during removal which would therefore require additional post-bonding effort.

Accordingly, the adhesive metal bonding process disclosed above has been tested to identify both unacceptable and acceptable combinations of vacuum bagging materials for thermally curing the bonding adhesive, with specific combinations identified to effectively reduce adhesive flash formed at the bond joint 22 between the solid metal components 10,12, and thusly eliminating the need for post-bonding deflashing procedures and the associated time and expense therefor.

The elimination or reduction of excessive flash formation during the adhesive bonding method now provides a new process in the manufacturing industry to supplement the presently known post-bonding adhesive flash removal methods.

Flash control and reduction may now be more efficiently achieved with a simple vacuum bagging process for metal-to-metal adhesive bonding at reduced manufacturing cost rendering unnecessary post-bonding deflashing for specific applications.

Particularly significant in the flash control metal bonding process described above is the now proven ability to effectively reduce excess flash by revising only the peel ply itself in a simple, but effective, combination of single, versus multiple, plies for each of the peel ply and breather ply inside the common vacuum bag. The additional use of the flashbreaker tape at desired locations further reduces excess flash locally.

And in other applications, some or all of the variables disclosed above may be tested in various combinations for evaluating efficacy of significantly reducing excess flash for eliminating the otherwise required post-bonding deflashing operations known in the art.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A method of bonding together first and second metal plates comprising:

supporting said first plate atop a corresponding mold;

positioning said second plate atop said first plate, with a thermosetting adhesive therebetween to form a lap joint;

vacuum bagging said second plate atop said first plate, with a porous peel ply applied directly atop both said first and second plates in a bridge therebetween covering said lap joint and a porous breather ply covering said peel ply;

applying a vacuum through said breather ply to clamp said second plate atop said first plate;

thermally curing said adhesive to bond said second plate to said first plate at said lap joint, with said breather and peel plies being preselected to capture adhesive seepage from said lap joint during said curing to correspondingly reduce cured adhesive flash exposed on said first plate; and removing said breather and peel plies from atop said first and second plates and removing therewith said captured adhesive seepage.

2. A method according to claim 1 wherein:

said second plate terminates at a step atop said first plate to expose said adhesive at said joint;

said peel ply conforms with said step adjacent to said adhesive in said joint; and said peel ply is preselected in porosity for locally channeling to said breather ply said adhesive seepage along said step during said curing.

3. A method according to claim 2 further comprising:

placing said mold and vacuum bagged first and second plates in an autoclave;

curing said adhesive under heat and pressure in said autoclave for effecting viscous seepage thereof from said joint; and preselecting said peel ply in combination with said adhesive, breather ply, curing temperature, and curing pressure for promoting said viscous adhesive seepage through said peel ply into said breather ply.

4. A method according to claim 3 wherein said peel ply is preselected to replace an otherwise required deflashing post-operation following thermal curing of said adhesive in a metal bonding method for said first and second plates using a different peel ply.

5. A method according to claim 3 further comprising:

applying a masking flashbreaker tape atop said first plate along said step adjacent to said exposed adhesive;

applying said peel ply directly atop said flashbreaker tape in said step and extending laterally oppositely directly atop both said first and second plates;

curing said adhesive for channeling said seepage both atop said flashbreaker tape and through said peel ply at said step; and removing said breather and peel plies and said captured adhesive seepage, and additionally removing said flashbreaker tape to tear flash thereon from said joint.

6. A method according to claim 3 wherein said peel ply is selected from a plurality of different pre-existing peel plies commercially available from a plurality of different manufacturers.

7. A method according to claim 3 further comprising:

adhesively bonding together said first and second plates in an original bonding method including an original peel ply to produce an initial bonded assembly;

measuring size of flash atop said first plate along said step in said initial bonded assembly;

revising said bonding method for a second set of said first and second plates to include at least one method difference in said vacuum bagging process and thermal curing;

adhesively bonding together said second set of first and second plates using said revised bonding method to produce a second bonded assembly;

measuring size of flash atop said first plate along said step in said second bonded assembly; and revising sequentially said difference in sequential bonding methods to produce corresponding bonded assemblies until measured flash in said revised bonding method is less than measured flash in a previous bonding method.

8. A method according to claim 7 wherein said bonding method difference includes replacing said original peel ply with a different peel ply having different characteristics.

9. A method according to claim 8 wherein only said peel ply difference is revised in said sequential bonding methods.

10. A method according to claim 8 further comprising:

applying an original flashbreaker tape atop said first plate along said step adjacent to said exposed adhesive in said original bonding method for masking said first plate from said flash; and said bonding method difference additionally includes replacing said original flashbreaker tape with a different flashbreaker tape having different characteristics.

11. A method according to claim 10 wherein only said peel ply and flashbreaker tape differences are revised in said sequential bonding methods.

12. A method according to claim 3 wherein said vacuum bagging comprises:

applying a single peel ply directly atop said first and second plates to conform with said step;

applying a single breather ply directly atop said single peel ply;

applying a vacuum bag sealingly joined around a perimeter thereof to said first plate to cover said breather and peel plies and said second plate; and said first and second plates are imperforate at said lap joint, with said thermosetting adhesive therein being exposed solely along said step for locally seeping through said peel ply at said step.

13. A method according to claim 3 wherein said peel ply is further preselected for tear resistance with said captured adhesive seepage to avoid tearing thereof upon removal of said breather and peel plies after said thermal curing of said adhesive.

14. A method according to claim 3 further comprising cleaning and priming said first and second metal plates prior to applying said thermosetting adhesive in said lap joint.

15. A method according to claim 3 wherein:

said first and second metal plates comprise aluminum;

said preselected breather ply comprises non-woven polyester fibers in a weight species of about 339 g/m$^2$;

said preselected peel ply is selected from the group consisting of woven nylon fabric in a thickness of about 0.152 mm and weight species of about 75 g/m$^2$; and open-weave woven nylon fabric in a thickness of about 0.114 mm and weight species of about 75 g/m$^2$; and said adhesive comprises a thermosetting epoxy structural adhesive film in a weight species of about 293 g/m$^2$ and a predetermined thermal and pressure curing cycle.

16. A method of bonding first and second metal plates with a thermosetting adhesive at a lap joint to reduce cured adhesive flash thereat comprising:

bridging said metal plates at said lap joint with a porous ply applied directly atop both said first and second plates in a bridge therebetween, with said porous ply being preselected to capture adhesive seepage from said lap joint;

vacuum bagging said metal plates and porous ply to clamp together said metal plates under vacuum;

thermally curing said adhesive for promoting viscous adhesive seepage into said porous ply; and removing said porous ply from said lap joint and removing therewith said captured adhesive seepage.

17. A method according to claim 16 wherein said porous ply is preselected in combination with said adhesive and curing temperature and pressure thereof for promoting said viscous adhesive seepage.

18. A method according to claim 17 further comprising:

adhesively vacuum bonding together said metal plates in an original bonding method;

measuring flash at said lap joint; and revising said vacuum bonding method sequentially with at least one corresponding method difference, and measuring flash at said lap joint until measured flash in said revised vacuum bonding method is less than measured flash in a previous vacuum bonding method.

19. A method according to claim 18 further comprising bridging said lap joint first with a porous peel ply covered in turn by a porous breather ply, with said peel ply being preselected in porosity for locally channeling to said breather ply said adhesive seepage, and said breather ply being preselected to capture said adhesive seepage.

\* \* \* \* \*